United States Patent
Hur et al.

(10) Patent No.: US 9,275,663 B2
(45) Date of Patent: Mar. 1, 2016

(54) HEATER TO KEEP READER HEAD IN STABLE TEMPERATURE RANGE

(71) Applicant: Seagate Technology LLC, Cupertino, CA (US)

(72) Inventors: Jung Wook Hur, Suwon (KR); Tae Won Kim, Yong-In (KR); Haejung Lee, Suwon (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/684,805

(22) Filed: Apr. 13, 2015

(65) Prior Publication Data

US 2015/0213817 A1    Jul. 30, 2015

Related U.S. Application Data (62) Division of application No. 13/955,920, filed on Jul. 31, 2013, now Pat. No. 9,007,882.

(51) Int. Cl.
    *G11B 5/02*     (2006.01)
    *G11B 5/455*    (2006.01)
    *G11B 5/40*     (2006.01)

(52) U.S. Cl.
    CPC .. *G11B 5/455* (2013.01); *G11B 5/40* (2013.01)

(58) Field of Classification Search
None
See application file for complete search history.

(56) References Cited

U.S. PATENT DOCUMENTS

| | | | |
|---|---|---|---|
| 6,574,061 B1 | 6/2003 | Ling et al. | |
| 7,035,031 B2 | 4/2006 | Kim et al. | |
| 7,385,777 B2 | 6/2008 | Satoh et al. | |
| 7,397,629 B1 | 7/2008 | Hertzberg | |
| 7,986,481 B2 | 7/2011 | Yamanaka et al. | |
| 2001/0055175 A1* | 12/2001 | Tokuyama et al. | 360/69 |
| 2002/0114095 A1* | 8/2002 | Katahara et al. | 360/53 |
| 2006/0092550 A1* | 5/2006 | Ishii et al. | 360/75 |
| 2006/0158768 A1* | 7/2006 | Tanabe | 360/75 |
| 2007/0188907 A1* | 8/2007 | Satoh et al. | 360/75 |
| 2007/0206313 A1* | 9/2007 | Iwase | 360/75 |
| 2008/0247073 A1* | 10/2008 | Park | 360/59 |
| 2009/0040659 A1 | 2/2009 | Nakamura et al. | |
| 2009/0310246 A1* | 12/2009 | Takahashi | 360/75 |
| 2010/0053788 A1* | 3/2010 | Uno | 360/31 |
| 2010/0073805 A1 | 3/2010 | Amano | |
| 2010/0128383 A1* | 5/2010 | Matsushita et al. | 360/75 |
| 2010/0208387 A1* | 8/2010 | Ehrlich | 360/97.02 |
| 2011/0205861 A1* | 8/2011 | Erden et al. | 369/13.27 |
| 2012/0287529 A1* | 11/2012 | Lueng et al. | 360/75 |

* cited by examiner

*Primary Examiner* — Thang Tran
(74) *Attorney, Agent, or Firm* — Taylor English Duma LLP (57) ABSTRACT

Technologies are described herein for utilizing a head heater to test temperature stability of a head of a storage device and to prevent the head from operating in an unstable temperature condition. A temperature condition of a read/write head in a storage device is ascertained and it is determined whether the temperature condition is within a predetermined range of temperature conditions in which the read/write head exhibits instability. If the temperature condition of the read/write head is within the predetermined range, a power level of a head heater of the read/write head is adjusted to change the temperature condition of the read/write head to be outside of the predetermined range.

20 Claims, 4 Drawing Sheets

HEATER TO KEEP READER HEAD IN STABLE TEMPERATURE RANGE

CROSS-REFERENCE TO RELATED APPLICATIONS

This application is a divisional of U.S. patent application Ser. No. 13/955,920, filed Jul. 31, 2013, and entitled "HEATER TO KEEP READER HEAD IN STABLE TEMPERATURE RANGE," the entirety of which is hereby incorporated herein by this reference.

BRIEF SUMMARY

The present disclosure relates to technologies for testing the temperature stability of a head of a storage device, such as a hard-disk drive ("HDD") device, and preventing the head from operating in an unstable temperature condition using an internal head heater. According to some embodiments, a method of maintaining stability in a read/write head of a storage device comprises ascertaining a temperature condition of the read/write head and then determining whether the temperature condition of the read/write head is within a predetermined range of temperature conditions in which the read/write head exhibits instability. If the temperature condition of the read/write head is within the predetermined range, a power level of a head heater of the read/write head is adjusted to change the temperature condition of the read/write head to be outside of the predetermined range.

According to further embodiments, a computer-readable storage medium comprises processor-executable instructions that, when executed by a processor, cause the processor to determine a temperature condition of the head and then determine whether the temperature condition of the head is within a predetermined range, the predetermined range comprising a range of temperature conditions in which the head exhibits instability. If the temperature condition of the head is within the predetermined range, then the processor-executable instructions cause the processor to adjust the power level to the head heater to change the temperature condition of the head to be outside of the predetermined range.

According to further embodiments, a system comprises the storage device, a processor, a memory, and a thermal control module. The thermal control module is configured to cause the processor to determine a temperature condition of a head of the storage device and then determine whether the temperature condition is within a range of temperature conditions in which the head exhibits instability. If the temperature condition of the head is within the range, a power level of a head heater of the head is adjusted to change the temperature condition of the head to be outside of the range.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for utilizing a head heater to test temperature stability of a head of a storage device and to prevent the head from operating in an unstable temperature condition. A typical storage device may include a hard-disk drive ("HDD") device. A magnetic read/write head in the HDD may exhibit instability when operating at certain temperature conditions. This instability of the head may not be detected during a "burn-in" or certification ("CERT") processing of the storage device performed at room temperature. For example, head instability symptoms may only exist in high or low temperature conditions. Determining instability of the head within different temperature ranges traditionally requires testing of the storage device in a temperature chamber during the CERT process.

According to embodiments presented herein, a head heater component of the read/write head in an HDD or other storage device may be utilized to simulate different head temperature conditions and determine head stability in various temperature ranges. Because the head heater can be utilized to simulate various temperature conditions of the head, temperature stability testing of the read/write head can be accomplished in room temperature conditions during the CERT process, for example. In some embodiments, the results of this temperature stability testing can be used to disqualify the head in the CERT process. In other embodiments, the instability of the head in various temperature ranges may be recorded and utilized during normal operation of the storage device, also referred to herein as the "user condition," to prevent the head from operating at a temperature state in which it exhibits instability, as will be described in more detail herein.

Figure 1:
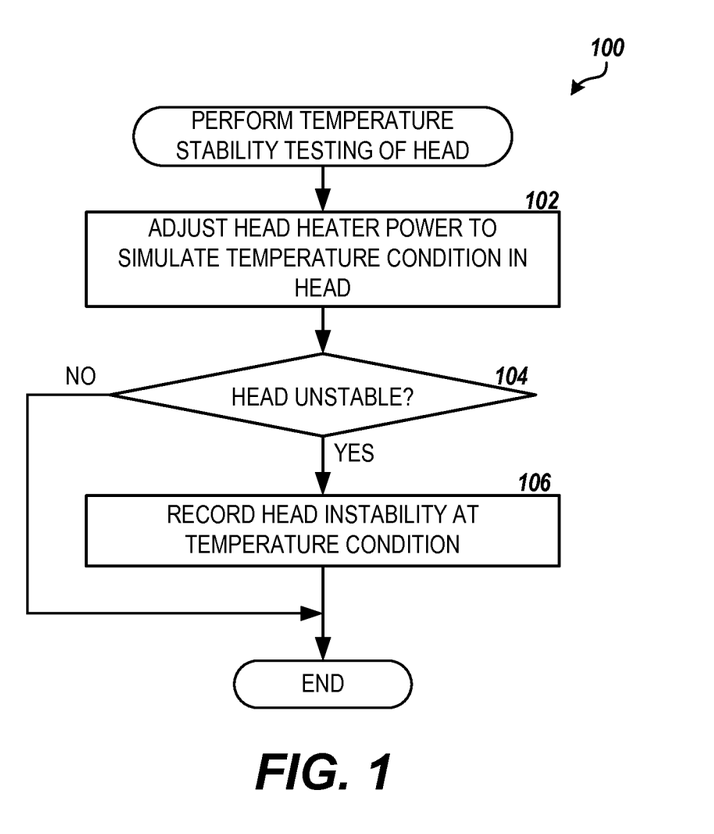
FIG. 1 is a flow diagram showing one routine for utilizing a head heater to test temperature stability of a head of a storage device, according to embodiments described herein.

FIG. 1 provides a high-level overview of a method for utilizing a head heater component of a read/write head of a storage device to perform temperature stability testing of the head, according to some embodiments. Specifically, FIG. 1 illustrates one routine 100 for utilizing the head heater to simulate a temperature condition of the head in order to test stability of the head in that temperature condition. According to some embodiments, the routine 100 may be performed by a controller of the storage device. In other embodiments, the routine 100 may be performed by a computing system external to and operably connected to the storage device.

The routine 100 begins at step 102, where the power level of the head heater is adjusted to simulate a desired temperature condition in the head. The head heater power level may be adjusted to a value that is correlated to a particular surface temperature of the head, for example, or the head heater may be adjusted through a range of power levels and the temperature condition of the head determined for the head heater power level. According to some embodiments, the temperature condition of the head may be determined based on the heater power level, a resistance of the head heater, a resistance of a flying-height sensor, a resistance of the reader element or any combination of these and/or other sensors or components in the head or storage device, as is described in more detail below in regard to FIG. 3.

From step 102, the routine 100 proceeds to step 104, where it is determined whether the head is unstable. In some embodiments, the instability of the head may be determined by measuring a head instability parameter and comparing it to a threshold value in the CERT process, as is further described below in regard to FIG. 3. If the head is determined not to be unstable, then the routine 100 ends. If the head is determined to be unstable, then the routine 100 proceeds from step 104 to step 106, where the instability of the head at the temperature condition induced in the head by the head heater is recorded. In some embodiments, one or more ranges of temperature conditions and/or power levels of the head heater within which the head exhibits instability may be determined and recorded. These ranges of temperature conditions in which the head exhibits instability may then be used by the controller of the storage device to prevent the head from operating in a temperature condition within an instable range, as is described in more detail below in regard to FIG. 4. In further embodiments, a determination that the head is unstable in one or more temperature conditions may cause the head to be disqualified from operation during the CERT process.

Figure 2:
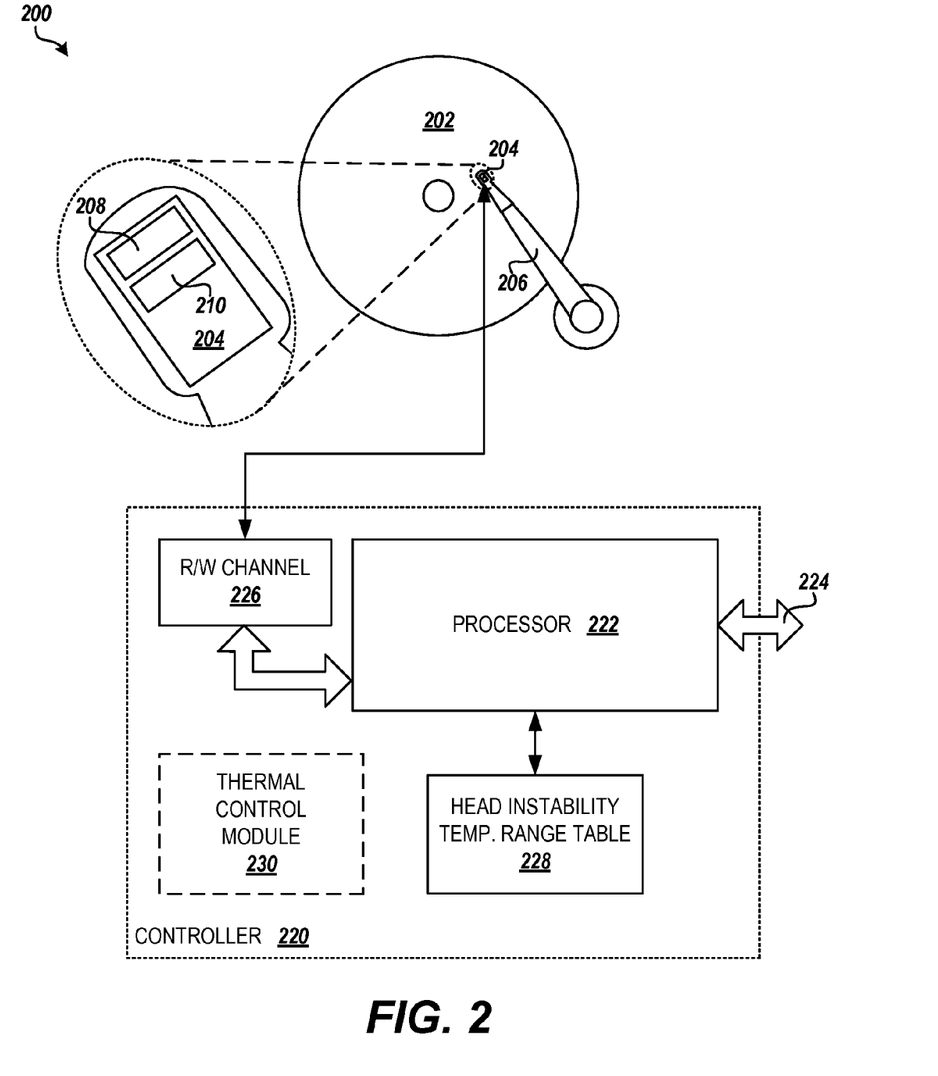
FIG. 2 is a block diagram showing an illustrative environment in which the embodiments described herein may be implemented, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with several hardware, software and components for utilizing a head heater to test temperature stability of the head(s) of the storage device and to prevent the head(s) from operating in an unstable temperature condition. The storage device 200 may include magnetic media comprising at least one platter or disk 202.

The storage device 200 further includes at least one read/write head 204 located adjacent to a surface of each disk 202. The read/write head 204 may read information from the disk 202 by sensing a magnetic field formed on portions of the surface of the disk, and may write information to the disk by magnetizing a portion of the surface of the disk. The read/write head 204 may be located at the distal end of an arm 206 that can be rotated in order to reposition the read/write head 204.

According to embodiments, the read/write head 204 further includes a head heater 208 component. The head heater 208 may comprise a flying-on-demand ("FOD") heater that controls the flying height of the read/write head 204 over the surface of the disk 202, according to some embodiments. In further embodiments, the read/write head 204 may also include a flying-height sensor 210. The flying-height sensor 210 may be utilized to determine the current flying height of the read/write head 204 over the surface of the disk 202. It will be appreciated by one of ordinary skill in the art that the read/write head 204 may comprise multiple additional components, such as a magneto-resistive ("MR") or tunneling MR reader element, a writer element, one or more sliders and the like. It will be further appreciated that the size, location and relative orientation of the head heater 208, the flying-height sensor 210 and the other elements shown in FIG. 2 are for illustrative purposes only, and one of ordinary skill in the art will recognize that other sizes, locations and relative orientations are possible and part of this disclosure.

The storage device 200 may further comprise a controller 220 that controls the operations of the storage device. The controller 220 may include a processor 222. The processor 222 may implement an interface 224 allowing the storage device 200 to communicate with a host device or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transferring the formatted data via a read/write channel 226 through the read/write head 204 and to the surface of the disk 202. The processor 222 may further process read commands from the host device by determining the location of the desired data on the surface of the disk 202, moving the read/write head(s) 204 to the location (track) of the data, reading the data from the surface of the disk via the read/write channel 226, correcting any errors and formatting the data for transfer to the host device.

The read/write channel 226 may convert data between the digital signals processed by the processor 222 and the analog signals conducted through the read/write head 204 for reading and writing data to the surface of the disk 202. The analog signals to and from the read/write head 204 may be further processed through a pre-amplifier circuit. The read/write channel 226 may further provide servo data read from the disk 202 to an actuator to position the read/write head 204. The read/write head 204 may be positioned at specific locations over the surface of the disk 202 for reading and writing data by moving the read/write head 204 radially across different tracks of the disk 202 using the actuator while the disk rotates.

The controller 220 may further include computer-readable storage media or "memory" for storing processor-executable instructions, data structures and other information. The memory may comprise a non-volatile memory, such as read-only memory ("ROM") and/or FLASH memory and a random-access memory ("RAM"), such as dynamic random access memory ("DRAM") or synchronous dynamic random access memory ("SDRAM"). The memory may further comprise a portion of the storage media of the storage device 200, such as the maintenance cylinder ("M/C") of the disk 202. For example, the non-volatile memory and/or the RAM may store a firmware that comprises commands and data necessary for performing the operations of the storage device 200. According to some embodiments, the non-volatile memory and/or the RAM may store processor-executable instructions that, when executed by the processor 222, perform the routines 100, 300 and 400 for utilizing the head heater 208 to test temperature stability of the read/write head 204 of the storage device 200 and to prevent the head from operating in an unstable temperature condition, as described herein.

A head instability temperature range table 228 may be made available to the processor 222 to perform various operations. In some embodiments, the head instability temperature range table 228 may be stored in non-volatile memory. The head instability temperature range table 228 may store information regarding one or more temperature conditions or ranges of temperature conditions in which the read/write head 204 exhibited instability during the CERT process, as will be described in more detail below in regard to FIG. 3. It will be appreciated that the head instability temperature range table 228 may store temperature ranges of instability for multiple read/write heads 204 of the storage device 200. In other embodiments, the head instability temperature range table 228 may be stored in some other memory in or accessible to the controller 220, including in the M/C of the disk 202.

In addition to the non-volatile memory and/or the RAM, the environment may include other computer-readable media storing program modules, data structures and other data described herein for utilizing a head heater 208 to test temperature stability of the read/write head(s) 204 of the storage device 200 and to maintain the heads in a stable temperature range. It will be appreciated by those skilled in the art that computer-readable media can be any available media that may be accessed by the controller 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the environment may include a thermal control module 230. The thermal control module 230 may perform the processes and methods described herein for utilizing the head heater 208 to test temperature stability of the head(s) 204 of the storage device 200 and to maintain the heads in a stable temperature range. According to some embodiments, the thermal control module 230 may be implemented in the controller 220 as software, hardware or any combination of the two. For example, the thermal control module 230 may be stored in the non-volatile memory as part of the firmware of the storage device 200 and may be executed by the processor 222 for performing the testing and operational methods and routines described herein. The thermal control module 230 may be alternatively or additionally stored in the RAM or other computer-readable media accessible by the controller 220.

In further embodiments, the thermal control module 230 may be implemented in a computing system external to and operably connected to the storage device 200 such as to perform the temperature stability testing methods and routines described herein, as part of a testing of the storage device components by the manufacturer, for example. The thermal control module 230 may further be stored in a memory or other computer-readable media accessible by the computing system and be executed by a processor of the computing system.

It will be appreciated that the structure and/or functionality of the storage device 200 may be different that that illustrated in FIG. 2 and described herein. For example, the processor 222, read/write channel 226, non-volatile memory, RAM and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 3:
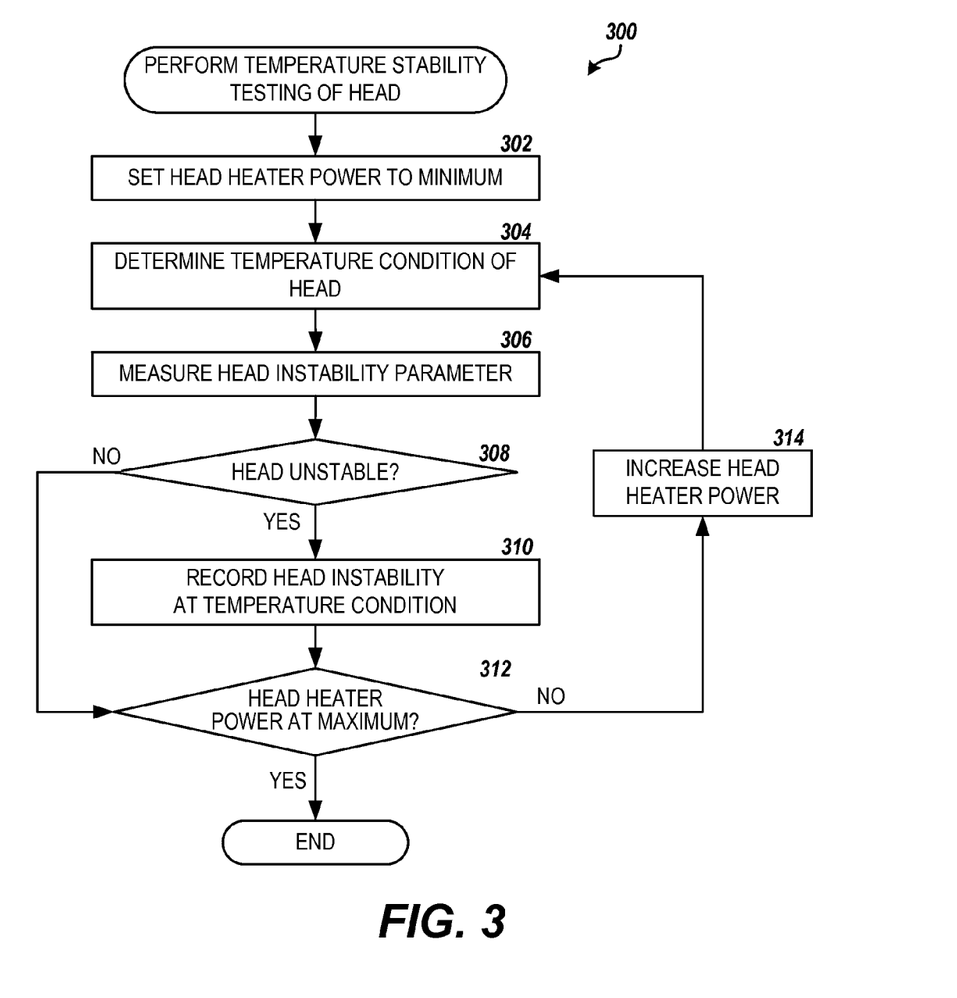
FIG. 3 is a flow diagram showing one routine for determining unstable temperature condition ranges for a head of a storage device during a certification process, according to embodiments described herein.

FIG. 3 illustrates one routine 300 for performing temperature stability testing of a target read/write head 204 of a storage device 200 utilizing a head heater 208 component onboard the head, according to some embodiments. The routine 300 may be utilized during the CERT process of the storage device 200 by the device manufacturer, for example, and may be performed in a room temperature condition of the storage device without the need for a temperature chamber or external heat source. In some embodiments, the routine 300 may be performed by the thermal control module 230 described above in regard to FIG. 2. In further embodiments, the routine 300 may be performed by the controller 220 of the storage device 200, by external processors or computing systems performing the CERT process or by some other combination of modules, processors and devices.

The routine 300 begins at step 302, where the thermal control module 230 sets the head heater 208 of the target read/write head 204 to a lowest power level in order to simulate a first temperature condition in the test. In some embodiments, the head heater 208 may be the FOD heater onboard the head 204, as described above in regard to FIG. 2. According to embodiments, a low power level applied to the FOD heater corresponds to a of low surface temperature of the read/write head 204, while a high power level applied to the FOD heater corresponds to a high surface temperature of the head. The FOD heater may have an operational range of 20 mW to 100 mW, for example. At step 302, the thermal control module 230 may set the head heater 208 to 20 mW of power.

From step 302, the routine 300 proceeds to step 304, where the thermal control module 230 determines a temperature condition of the target read/write head 204 resulting from the power level currently applied to the head heater 208. In some embodiments, the temperature condition of the read/write head 204 may comprise an estimated temperature calculated from a measurement of the resistance of the FOD heater. The FOD heater resistance may be proportional to the current heater power level and the surface temperature of the read/write head 204. In other embodiments, the temperature of the head may be estimated from a measurement of the resistance of a flying-height sensor 210 onboard the read/write head 204. The flying-height sensor 210 may be the component on the read/write head 204 that is most sensitive to temperature changes in the head. In further embodiments, the temperature condition of the read/write head 204 may be based on a combination of these and/or other sensors in the head 204 or the storage device 200. For example, the temperature condition of the read/write head 204 may be determined from a resistance of a MR reader element onboard the head, from readings of one or more temperature sensors in the storage device 200 and the like. In further embodiments, the temperature condition of the read/write head 204 may be determined from known correlations between head heater power level and head surface temperature in room temperature testing conditions developed from the CERT processing of similar storage devices 200.

The routine 300 proceeds from step 304 to step 306, where the thermal control module 230 measures a head instability parameter of the target read/write head 204. According to some embodiments, instability in the head 204 may be indicated by fluctuations in channel statistical measurements ("CSMs") collected via the read/write channel 226 of the storage device 200 during read operations in the CERT process. The CSMs may represent the number of broken bits read during a reading operation through the read/write channel 226. For example, 1000 CSMs may be collected by the thermal control module 230, and deltas (differences) may be calculated between CSMs 1-500 and CSMs 501-1000. The thermal control module 230 may then calculate a standard deviation in these delta values for the head instability parameter. In other embodiments, the head instability parameter may be based on a bit error rate ("BER"), SOVA error rates or other measurements indicating head instability as known in the art.

From step 306, the routine 300 proceeds to step 308, where the thermal control module 230 determines if the target read/write head 204 is unstable. For example, the thermal control module 230 may determine whether the head instability parameter measured in step 306 exceeds a threshold value. The threshold value may be determined from successive tests of the CERT process on batches of similar storage devices 200. Higher threshold values, such as 2500, may result in fewer temperature conditions in which the head 204 is determined to be unstable, while lower threshold values, such as 1000, may result in more temperature conditions in which the head is determined to be unstable.

If the head is determined to be unstable, then the routine 300 proceeds from step 308 to step 310, where the thermal control module 230 records the instability of the target read/write head 204 at the temperature condition determined in step 304. In some embodiments, the instability of the head 204 at the determined temperature condition may be recorded in the head instability temperature range table 228 described above in a form shown below in TABLE 1:

TABLE 1

Storage of Instability of Head at Estimated Temperature

| Head | Temperature Condition | Instability Detected |
|---|---|---|
| N | X | 1 |

As illustrated in TABLE 1, the value N may identify the target read/write head 204 in the storage device 200. The value N may further identify whether the read element or write element of the target head exhibited the instability. The value X may represent the temperature condition, such as an estimate of the head temperature, determined for the head in step 304. Alternatively or additionally, the value of X may represent the value of a measurement corresponding to the determined temperature condition, such as the resistance of the head heater 208, the resistance of the flying-height sensor 210 or the like. In further embodiments, the entry in the head instability temperature range table 228 may contain a range of temperature conditions X within which the identified head N exhibited instability. A value of "1" stored in the "Instability Detected" field may indicate that instability was detected in the identified head N at the temperature condition or range of temperature conditions represented by X, for example.

It will be appreciated by one skilled in the art that the tabular data shown in TABLE 1 is provided for illustrative purposes only, and that the head instability temperature range table 228 containing data regarding one or more temperature conditions in which a read/write head 204 exhibited instability may represent a data file, a database table, an object stored in a computer memory, a programmatic structure or any other data container commonly known in the art. Each data element included in the data structure may represent one or more fields in a data file, one or more columns of a database table, one or more attributes of an object, one or more member variables of a programmatic structure or any other unit of data of a data structure commonly known in the art. The implementation is a matter of choice and may depend on the technology, performance and other requirements of the processor 222, controller 220 or other elements of the storage device 200 in which the data structures are implemented. It will be further appreciated that each entry in the head instability temperature range table 228 may contain additional data elements beyond those shown in TABLE 1 and described above.

Next, the routine 300 proceeds to step 312, where the thermal control module 230 determines whether the power level currently applied to the head heater 208 is at the maximum level. For example, utilizing the FOD heater example above, the thermal control module 230 may determine whether the power level currently applied to the head heater 208 is 100 mW. If the power level currently applied to the head heater is at the maximum level, then the routine 300 ends. If the head heater power level is not at the maximum level, then the routine 300 proceeds from step 312 to step 314, where the thermal control module 230 increases the power level applied to the head heater 208 to simulate the next temperature condition in the test. According to some embodiments, the temperature of the head heater 208 may be raised by 2° C. for each 1 mW of power applied to the heater. The thermal control module 230 may raise increase the power level of the head heater 208 by 1 mW for each iteration of the temperature stability testing process in order to simulate a full range of temperature conditions.

From step 314, the routine 300 returns to step 304, where the thermal control module 230 executes another iteration of the temperature stability testing process at the new power level applied to the head heater 208. It will be appreciated that the multiple iterations of the temperature stability testing process over a range of power levels applied to the head heater 208 will allow for a range of temperature conditions to be tested and may result in one or more ranges of temperature conditions in which the target read/write head 204 exhibited instability being recorded in the head instability temperature range table 228. It will further be appreciated that other power level ranges and power increments of the head heater 208 may be utilized beyond those described herein to perform the temperature stability testing as described in regard to routine 300 above, and it is intended that all such power levels and power increments be included in the scope of this disclosure.

Figure 4:
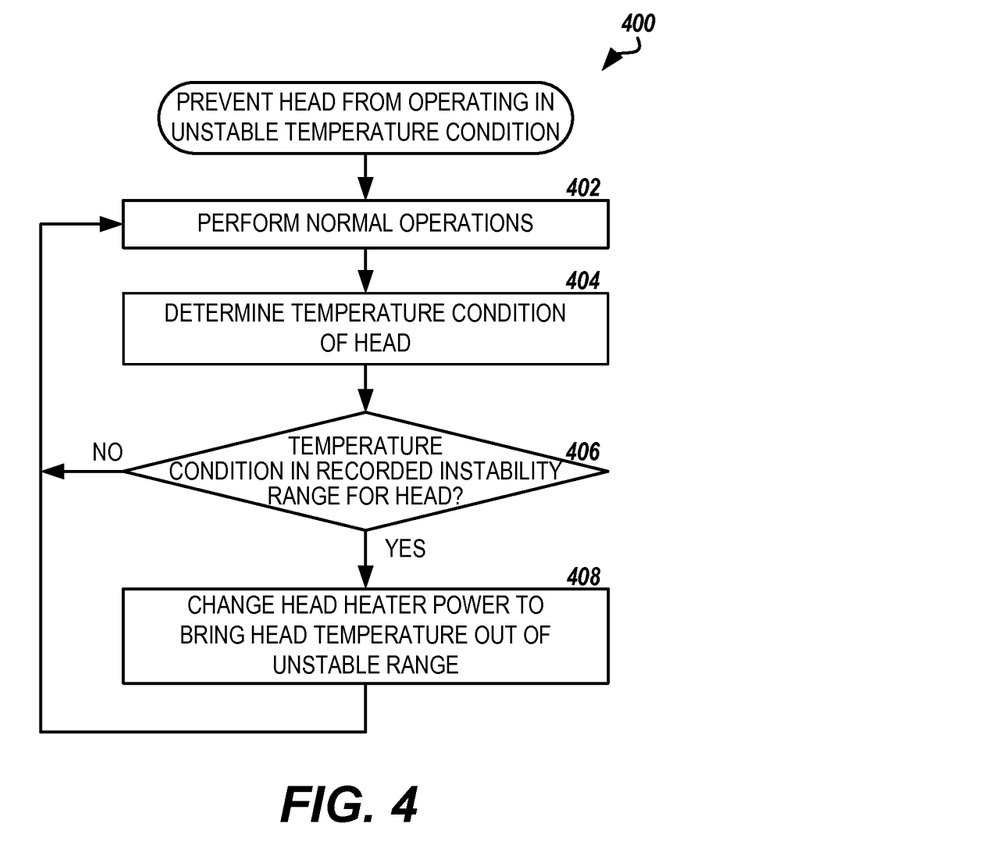
FIG. 4 is a flow diagram showing one routine for preventing the head from operating in an unstable temperature condition during normal operation of the storage device, according to embodiments described herein.

FIG. 4 illustrates a routine 400 for utilizing the head heater 208 of a read/write head 204 to prevent it from operating in an unstable temperature condition, according to further embodiments. The routine 400 may be utilized during the normal operation or user condition of the storage device 200, for example. In some embodiments, the routine 400 may be performed by the thermal control module 230 executing as part of the firmware on the controller 220 of the storage device 200, as described above in regard to FIG. 2. In further embodiments, the routine 400 may be performed by external processors or computing systems operably connected to the storage device or by some other combination of modules, processors and devices.

The routine 400 begins at step 402, where the storage device 200 performs normal operations in the user condition. During normal operations of the storage device 200, the thermal control module 230 may determine the temperature condition of a target read/write head 204 of the storage device 200, as indicated at step 404. The temperature condition of the target head 204 may be determined on a periodic basis, upon every read and/or write operation executed in the storage device 200, upon the occurrence of a particular condition in the storage device, such as excessive read failure rates or a final data read failure and the like.

According to embodiments, the thermal control module 230 may determine the temperature condition of the target read/write head 204 using one or more measurements taken from components and/or sensors in the head or the storage device, as described above in regard to FIG. 3. For example, the temperature condition may be determined from a measurement of the resistance of the FOD heater and the current power level applied to the FOD heater. In other embodiments, the temperature condition of the head 204 may be determined from a measurement of the resistance of a flying-height sensor 210 onboard the head or from temperature sensors in the head or the storage device 200.

From step 404, the routine 400 proceeds to step 406, where the thermal control module 230 determines whether the temperature condition falls within a range of temperature conditions in which the target read/write head 204 exhibits instability. In some embodiments, the thermal control module 230 may determine this by comparing the temperature condition of the head 204 determined in step 404 with the entries for the head in the head instability temperature range table 228 indicating temperature conditions or temperature condition ranges in which the target head exhibited instability during the CERT process or other testing of the storage device 200. If it is determined that the current temperature condition of the target read/write head 204 falls within a range of temperature conditions in which the head 204 exhibits instability, then the routine 400 proceeds from step 406 to step 408, where the thermal control module 230 may adjust the power level applied to the head heater 208 of the head to change the temperature condition of the head in order to achieve a stable condition for the head.

For example, if the thermal control module 230 determines that the combination of the current FOD heater power level and the current FOD heater resistance indicate a surface temperature of the read/write head 204 in an unstable high temperature condition, according to one or more entries in the head instability temperature range table 228, then the thermal control module 230 may decrease the power level applied to the FOD heater in order to reduce the temperature of the head to a stable temperature range. It will be appreciated that this reduction in FOD heater power may be performed though it may result in a less than optimal flying-height of the head, in order to ensure that the stability of the read/write is maintained, according to some embodiments. In another example, if it is determined from the resistance of the flying-height sensor 210 on the target read/write head 204 that the head is operating at an unstable low temperature condition, according to one or more entries in the head instability temperature range table 228, then the thermal control module 230 may increase the power level applied to the head heater 208 of the head in order to increase the temperature of the head to a stable temperature range. Next, the routine 400 returns to step 402 where the storage device 200 resumes performing normal operations.

It will be appreciated that there may be any number of temperature conditions of the read/write head 204 that occur during normal operation of the storage device 200 that may cause the thermal control module 230 to change the power level applied to the head heater 208 in order to place the head in a stable temperature condition beyond those described herein and shown in FIG. 4. It will be further appreciated that the embodiments described herein may also be utilized to test temperature stability and maintain stability of reader heads and/or writer heads in an HDD, and that the embodiments described herein may further be utilized any storage device containing a read/write head 204 with a head heater 208, including, but not limited to, a magnetic tape drive or an optical disk drive.

Based on the foregoing, it will be appreciated that technologies for utilizing a head heater to test temperature stability of a head of a storage device and to prevent the head from operating in an unstable temperature condition are presented herein. The above-described embodiments are merely possible examples of implementations, merely set forth for a clear understanding of the principles of the present disclosure. The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might" or "may," unless specifically stated otherwise or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
   determining a temperature condition of a read/write head in a storage device;
   determining whether the temperature condition of the read/write head is within a predetermined range, the predetermined range comprising a range of temperature conditions in which the read/write head exhibits instability; and
   in response to determining that the temperature condition of the read/write head is within the predetermined range, adjusting a power level of a head heater of the read/write head to change the temperature condition of the read/write head to be outside of the predetermined range.

2. The method of claim 1, wherein determining the temperature condition of the head comprises measuring a resistance of the head heater.

3. The method of claim 1, wherein the predetermined range is determined by performing steps of:
   applying a first power level to the head heater, the first power level configured to simulate a first temperature condition in the read/write head;
   determining an instability of the read/write head with the first power level applied to the head heater;
   recording the temperature condition of the head and the instability in a memory; and
   repeating the applying, determining, and recording steps for a plurality of power levels.

4. The method of claim 3, wherein the predetermined range is determined during a burn-in process of the storage device.

5. The method of claim 3, wherein determining the instability of the read/write head comprises collecting a plurality of channel statistical measurements and determining that a standard deviation in deltas between the plurality of channel statistical measurements exceeds a threshold value.

6. The method of claim 1, wherein the head heater comprises a flying-on-demand heater.

7. The method of claim 1, wherein the steps are performed by an onboard controller of the storage device.

8. A computer-readable storage medium having processor-executable instructions stored thereon that, when executed by a processor, cause the processor to:
- determine a temperature condition of a head in a storage device;
- determine whether the temperature condition of the head is within a predetermined range, the predetermined range comprising a range of temperature conditions in which the head exhibits instability; and
- in response to determining that the temperature condition of the head is within the predetermined range, adjust a power level of a head heater of the head to change the temperature condition of the head to be outside of the predetermined range.

9. The computer-readable storage medium of claim 8, wherein determining the temperature condition of the head comprises measuring a resistance of the head heater.

10. The computer-readable storage medium of claim 8, wherein determining the temperature condition of the head comprises measuring a resistance of a flying-height sensor of the head.

11. The computer-readable storage medium of claim 8, wherein the head heater comprises a flying-on-demand heater.

12. The computer-readable storage medium of claim 8, having further processor-executable instructions stored thereon that cause the processor to:
- apply a first power level to the head heater;
- determine the temperature condition of the head with the first power level applied to the head heater;
- measure a head instability parameter of the head;
- determine whether the head exhibits instability based on the head instability parameter; and
- upon determining that the head exhibits instability, record the temperature condition of the head and the instability in a memory.

13. The computer-readable storage medium of claim 12, having further processor-executable instructions stored thereon that cause the processor to repeat the apply, determine, measure, and record steps for a plurality of power levels to determine the range of temperature conditions in which the head exhibits instability.

14. The computer-readable storage medium of claim 13, wherein the range of temperature conditions in which the head exhibits instability is determined during a burn-in process of the storage device.

15. The computer-readable storage medium of claim 12, wherein the head instability parameter comprises a standard deviation in deltas calculated between a plurality of channel statistical measurements collected from the head.

16. The computer-readable storage medium of claim 15, wherein determining whether the head exhibits instability comprises determining whether the standard deviation in the deltas calculated between the plurality of channel statistical measurements exceeds a threshold value.

17. A system comprising:
- a storage device comprising a head having a head heater;
- a processor operably connected to the storage device;
- a memory operably connected to the processor; and
- a thermal control module operably connected to the processor and configured to cause the processor to perform the steps of
- determine a temperature condition of the head,
- determine whether the temperature condition is within a range of temperature conditions in which the head exhibits instability, and
- in response to determining that the temperature condition is within the range of temperature conditions in which the head exhibits instability, adjusting a power level of the head heater to change the temperature condition of the head to be outside of the range of temperature conditions in which the head exhibits instability.

18. The system of claim 17, wherein the range of temperature conditions in which the head exhibits instability is determined during a burn-in process of the storage device and where the head is disqualified based on the range of temperature conditions in which the head exhibits instability.

19. The system of claim 17, wherein the range of temperature conditions in which the head exhibits instability is determined during a burn-in process of the storage device and stored in the memory.

20. The system of claim 17, wherein the head heater comprises a flying-on-demand heater.

* * * * *